United States Patent
Kennedy

(10) Patent No.: US 8,092,675 B2
(45) Date of Patent: Jan. 10, 2012

(54) ENERGY GENERATION METHODS AND SYSTEMS FOR SWIMMING POOLS AND OTHER VESSELS WITH RECIRCULATING FLUID

(75) Inventor: Gary Andrew Kennedy, Surfers Paradise (AU)

(73) Assignee: Zodiac Group Australia Pty. Ltd. (AU)

( * ) Notice: Subject to any disclaimer, the term of this patent is extended or adjusted under 35 U.S.C. 154(b) by 349 days.

(21) Appl. No.: 12/244,083

(22) Filed: Oct. 2, 2008

(65) Prior Publication Data

US 2011/0064626 A1    Mar. 17, 2011

Related U.S. Application Data

(60) Provisional application No. 60/978,174, filed on Oct. 8, 2007.

(51) Int. Cl.
    *C02F 1/00*     (2006.01)

(52) U.S. Cl. ............ 210/167.11; 422/28; 204/194; 210/749

(58) Field of Classification Search ............ 422/28, 422/37; 204/194; 210/749, 167.1, 167.11
See application file for complete search history.

(56) References Cited

U.S. PATENT DOCUMENTS

| | | | |
|---|---|---|---|
| 716,650 A | 12/1902 | Wheeler et al. | |
| 2,436,683 A | 2/1948 | Wood, Jr. | |
| 3,750,001 A | 7/1973 | McCloskey | |
| 3,845,291 A | 10/1974 | Portyrata | |
| 4,246,753 A | 1/1981 | Redmond | |
| 4,272,686 A | 6/1981 | Suzuki | |
| 4,352,025 A | 9/1982 | Troyen | |
| 4,408,127 A | 10/1983 | Santos, Sr. | |
| 4,616,298 A | 10/1986 | Bolson | |
| 4,918,369 A | 4/1990 | Solorow | |
| 5,228,964 A | 7/1993 | Middleby | |
| 6,798,080 B1 | 9/2004 | Baarman et al. | |
| 6,864,591 B2 | 3/2005 | DeFrank | |
| 6,981,650 B2 | 1/2006 | Uy et al. | |
| 7,019,411 B2 | 3/2006 | Satou et al. | |
| 7,067,936 B2 | 6/2006 | Baarman et al. | |
| 7,117,554 B2 | 10/2006 | Pichon | |
| 7,233,078 B2 | 6/2007 | Baarman et al. | |
| 7,357,599 B2 | 4/2008 | Cripps | |
| 7,398,138 B2 | 7/2008 | Emery et al. | |
| 2005/0248161 A1 | 11/2005 | Heidel | |

FOREIGN PATENT DOCUMENTS

| | | |
|---|---|---|
| DE | 19808328 | 9/1999 |
| EP | 1348913 | 10/2003 |
| EP | 1553356 | 7/2005 |
| WO | WO01/55589 | 8/2001 |

*Primary Examiner* — Sean E Conley
(74) *Attorney, Agent, or Firm* — Dean W. Russell; Kilpatrick Townsend & Stockton LLP

(57) ABSTRACT

Detailed is electricity generation for powering devices associated with swimming pools or other structures utilizing recirculating fluid. The recirculating fluid is used to produce electricity for direct or indirect supply to electrical devices. Turbines may be placed in by-pass channels so as to have access to some fluid flow yet not unduly disrupt main flow of the recirculating fluid.

12 Claims, 3 Drawing Sheets

ENERGY GENERATION METHODS AND SYSTEMS FOR SWIMMING POOLS AND OTHER VESSELS WITH RECIRCULATING FLUID

REFERENCE TO PROVISIONAL APPLICATION

This application is based on and hereby refers to U.S. Provisional Patent Application Ser. No. 60/978,174, filed Oct. 8, 2007, entitled "Turbine Generator," the entire contents of which provisional patent application are incorporated herein by this reference.

FIELD OF THE INVENTION

This application relates to methods and systems for generating energy for use in fluid-containing vessels such as swimming pools and more particularly, but not exclusively, for using recirculating water to generate electricity for, directly or indirectly, powering pool-related equipment such as electrical cleaners, chlorinators, monitors, controllers, booster pumps, and similar devices.

BACKGROUND OF THE INVENTION

Numerous products for water-containing vessels (such as but not limited to swimming pools, spas, and hot tubs) utilize electrical energy for operation. This electricity conventionally is supplied via residential or commercial electrical mains. U.S. Pat. No. 6,981,650 to Uy, et al., for example, describes a heater for a pool or spa designed to operate using power furnished by electrical mains (and passed through a voltage step-down transformer). Controller systems operable using electrical mains or other power sources are discussed in, for example, U.S. Pat. No. 7,398,138 to Emery, et al., while an exemplary electrically-powered automatic swimming pool cleaner is disclosed in U.S. Pat. No. 7,117,554 to Pichon. The entire contents of each of the Uy, Emery, and Pichon patents are incorporated herein by this reference.

In some situations, solar power alternatively may be used to generate electricity. U.S. Pat. No. 3,845,291 to Portyrata addresses yet another approach, using a water-powered turbine to power a generator. The generator in turn directly powers a lamp assembly for illuminating portions of a swimming pool. In the system of the Portyrata patent, the lamp assembly is in-line with the flowing water; indeed, the lens housing of the assembly must include an outlet so that water may exit the assembly and return to the swimming pool. A similar in-line, direct-power system is disclosed in U.S. Pat. No. 4,616,298 to Bolson, with the exiting water emitted as a "fine decorative spray" or, apparently, in conjunction with fire-suppression sprinklers. See Bolson, col. 4, 11. 30-32; col. 5, 11. 4-7. The entire contents of each of the Portyrata and Bolson patents are incorporated herein by this reference.

Omitted from these latter two patents is any contemplation of non-in-line, indirect powering of electrical devices within or associated with fluid-containing vessels. Non-in-line operation, for example, avoids need necessarily to seal any water-sensitive components of the devices from the water flowing therethrough. It also avoids impeding water flow that would occur by forcing the water to exit small or fine openings, as in the lamp assemblies of the Portyrata and Bolson patents. Providing indirect powering permits systems to store electrical energy in batteries or similar storage units for later use.

SUMMARY OF THE INVENTION

The present invention provides versions of a turbine-driven generator distinct from any electrically-powered device, hence averting any need for water to flow directly through such a device. Other versions of the invention alternatively may create a by-pass channel of the fluid flow for purposes of generating electricity. Versions of the invention further may be connected electrically to storage batteries, capacitors, or other electrical storage mechanisms for purposes of storing electricity for later use. They thus need not directly power pool or other equipment but rather may do so indirectly.

One embodiment of the invention incorporates a turbine into a by-pass channel for powering a salt-water chlorinator (SWC) for a swimming pool. While main water flow remains through the SWC, a portion of the incoming flow is diverted to the turbine. Electricity generated using the turbine and an associated generator may be used to operate the SWC. This embodiment conveniently may be housed within a single structure if desired.

Embodiments of the invention additionally may be controlled locally or remotely by, for example, the Jandy AquaLink or Polaris EOS controllers. Such controllers could initiate valving or other action designed to close the by-pass channel, for example, or select to which devices the generated electricity will be routed. Alternatively or additionally, a controller may cause electricity generation to cease even though water is flowing past the turbine.

It thus is an optional, non-exclusive object of the present invention to provide methods and systems for generating energy utilizing flowing fluid.

It is an additional optional, non-exclusive object of the present invention to provide methods and systems for generating electricity using water recirculating in connection with a swimming pool, spa, or hot tub.

It is another optional, non-exclusive object of the present invention to provide methods and systems for generating electricity and supplying it indirectly to electrical devices, thereby avoiding any need for recirculating water to flow through the electrical devices themselves.

It is also an optional, non-exclusive object of the present invention to provide methods and systems for generating electricity using turbines placed in by-pass flow channels.

It is a further optional, non-exclusive object of the present invention to provide methods and systems for generating electricity for storage in batteries or other equipment for later use.

Other objects, features, and advantages of the present invention will be apparent to those skilled in the appropriate fields with reference to the remaining text and the drawings of this application.

DETAILED DESCRIPTION

Figure 1:
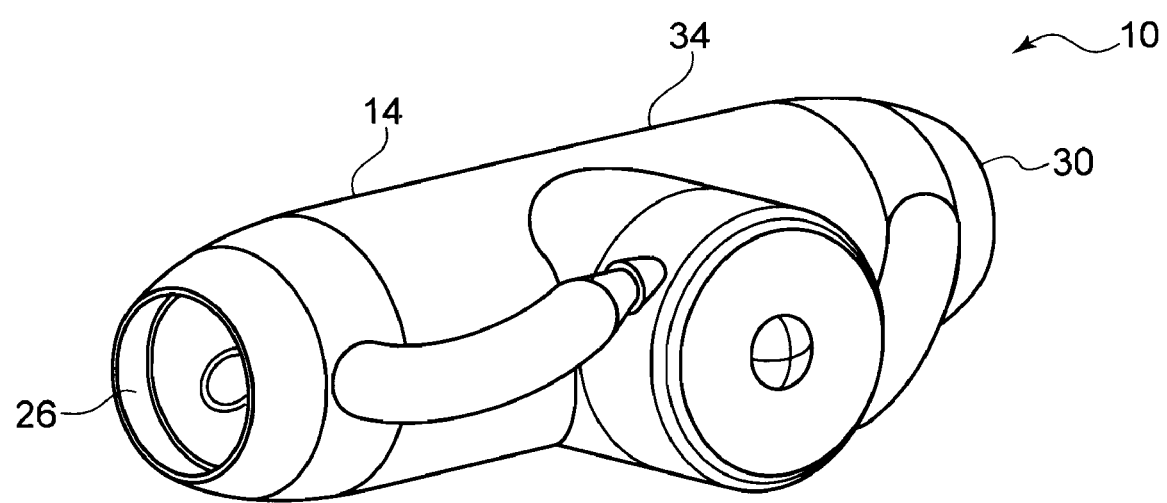
FIG. 1 is a perspective view of an SWC incorporating aspects of the present invention.
Figure 2:
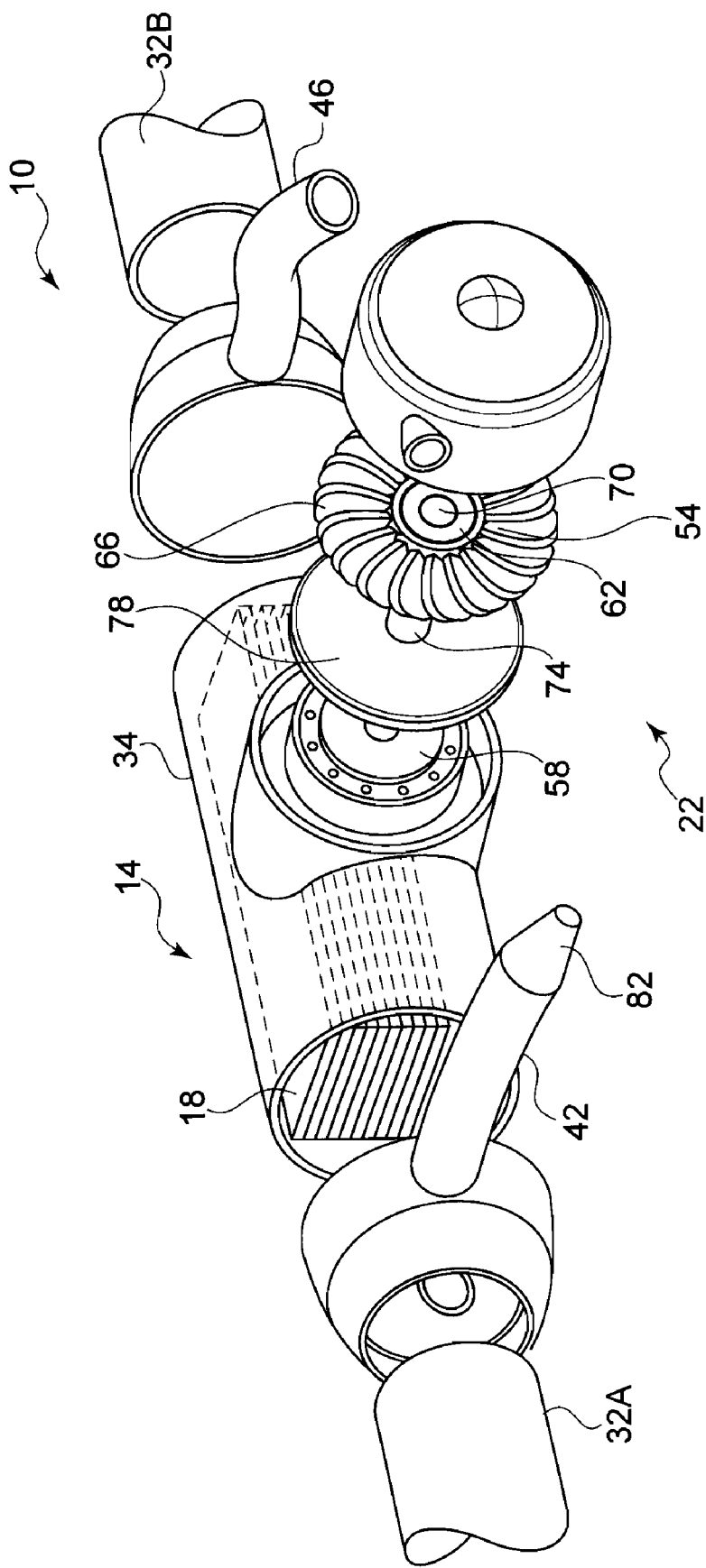
FIG. 2 is an exploded perspective view of the SWC of FIG. 1.
Figure 3:
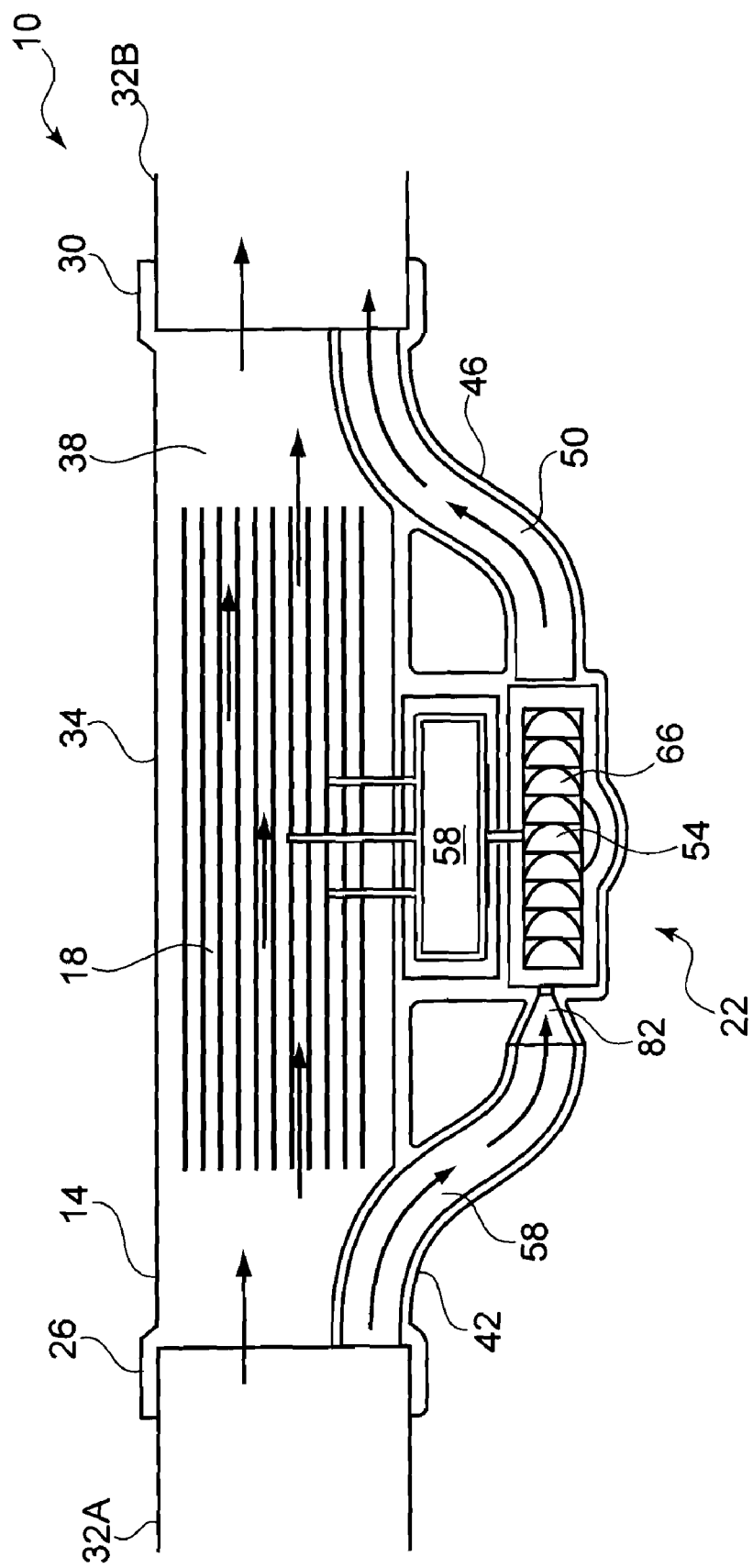
FIG. 3 is a cross-sectional, partially schematicized view of the SWC of FIG. 1.

Illustrated in FIGS. 1-3 is exemplary device 10 incorporating aspects of the present invention. Device 10 may include an SWC—as shown in FIGS. 1-3—or some other electrically-powered equipment. Alternatively, device 10 may be or include a battery or similar object used to store electricity for subsequent use. Yet alternatively, device 10 may comprise solely an electricity-generating mechanism.

As depicted, however, device 10 includes housing 14, SWC 18, and electricity-generating mechanism 22. Housing 14 may comprise fluid inlet 26 and fluid outlet 30, each of which is configured for connection to hoses or pipes 32A-B typically employed in swimming pool installations. Interposed between inlet 26 and outlet 30 is main body 34 defining main fluid flow path 38. Housing 14 additionally may comprise by-pass inlet section 42 and by-pass outlet section 46 forming part of secondary flow path 50.

SWC 18 may be any suitable chlorinator. One possible chlorinator for SWC 18 is that disclosed in U.S. Pat. No. 5,228,964 to Middleby, whose contents are incorporated herein by this reference. Those skilled in the art will recognize that other chlorinators may be used instead, however.

Electrical power for SWC 18 may be supplied by electricity-generating mechanism 22. Disposed in secondary flow path 50, mechanism 22 may include turbine 54 and generator 58. Turbine 54 preferably is a crossflow impulse or reaction device, although other turbines may be utilized as alternatives. Turbine 54 includes hub 62 from which multiple blades 66 extend generally radially. A central opening 70 in hub 62 receives shaft 74 of generator 58 so as to connect the two components. Separating turbine 54 and generator 58 may be water-impermeable wall 78 of housing 14, reducing risk of water flowing within path 50 from contacting the generator 58. Like hub 62, wall 78 may include a central opening through which shaft 74 may pass.

Pressurized water flowing through pipe 32A enters housing 14 via inlet 26. Most of the flowing water thence enters main body 34, interacts with SWC 18, and exits housing 14 via outlet 30 for return to pipe 32B of the recirculation system. Part of the pressurized water, however, is diverted to inlet section 42.

Inlet section 42 may include nozzle 82 designed to focus diverted water flow onto blades 66, thereby rotating turbine 54. Rotation of turbine 54 in turn rotates shaft 74, which movement is used by generator 58 to create electricity. The created electricity may then be used to operate SWC 18 (as shown schematically in FIG. 3); alternatively, as noted above, the electricity may be stored in one or more batteries or similar devices or used to power other equipment or components. After impinging on blades 66, water continues in outlet section 46 of flow path 50 before rejoining main flow path 38 at outlet 30.

Alternate embodiments of device 10 may incorporate (at least) turbine 54 of mechanism 22 into main flow path 38, omitting either or both of SWC 18 and secondary flow path 50. In these embodiments, electricity generated by mechanism 22 would be transferred for use by one or more devices distinct from housing 14. Such devices could be battery or electrically-powered equipment such as (but not limited to) automatic or in-floor pool cleaners, pool heaters, controllers, chemical dispensers or monitors, lights, water features, valves, timers, pool covers, service indicators, or water chemistry or temperature indicators. Other alternate embodiments of device 10 simply may incorporate some or all of one or more of these devices into housing 14 in place of SWC 18, retaining mechanism 22 in secondary flow path 50. Yet additional versions of device 10 may include valves or other means for closing secondary flow path 50 as, for example, when signaled by a controller.

The foregoing is provided for purposes of illustrating, explaining, and describing embodiments of the present invention. Modifications and adaptations to these embodiments will be apparent to those skilled in the art and may be made without departing from the scope or spirit of the invention.

What is claimed is:

1. A method of supplying electricity to an electrical device associated with a vessel selected from the group consisting of swimming pools, spas, and hot tubs, comprising:
   a. causing water to circulate, under influence of a pump distinct from the electrical device, into and out of the vessel;
   b. causing the circulating water to flow in a main channel and a by-pass-channel, the by-pass channel having blades of a turbine positioned therein;
   c. causing the circulating water to interact with the blades of the turbine so as to generate electricity;
   d. storing at least some of the generated electricity; and
   e. supplying at least some of the stored electricity to the electrical device for its operation.

2. A method according to claim 1 further comprising passing the circulating water through a nozzle prior to its interacting with the blades of the turbine.

3. A method according to claim 1 in which the main channel has the electrical device positioned therein.

4. A method according to claim 1 in which the electrical device is a salt water chlorinator.

5. A method according to claim 1 in which the electrical device is selected from the group consisting of automatic or in-floor pool cleaners, pool heaters, controllers, chemical dispensers or monitors, lights, water features, valves, timers, pool covers, service indicators, and water chemistry or temperature indicators.

6. A method according to claim 1 further comprising causing a controller to communicate with the turbine.

7. A method according to claim 6 in which the controller controls generating of electricity by the turbine.

8. A method according to claim 6 in which the electrical device is the controller.

9. A chlorinator assembly comprising:
   a. a housing defining a fluid inlet, and fluid outlet, a main fluid flow path, and a secondary fluid flow path;
   b. a chlorinator positioned, at least in part, in the main fluid flow path;
   c. an electricity-generating mechanism positioned, at least in part, in the secondary fluid flow path and connected electrically to the chlorinator;
   d. a pump for causing fluid to flow from the fluid inlet to the fluid outlet; and
   e. means for storing at least some of the generated energy for subsequent powering of an electrical device other than the pump.

10. A chlorinator assembly according to claim 9 in which the housing comprises means for changing the flow of fluid in the secondary fluid flow path.

11. A chlorinator assembly according to claim 10 in which the flow-changing means comprises a nozzle.

12. A chlorinator assembly according to claim 11 in which the housing is configured to that fluid flowing in the secondary fluid flow path encounters the nozzle prior to its encountering the electricity-generating mechanism.

\* \* \* \* \*